United States Patent [19]

Eggensperger et al.

[11] 3,903,173

[45] Sept. 2, 1975

[54] LOWER ALKYLTHIOMETHYLENE CONTAINING PHENOLS

[75] Inventors: Heinz Eggensperger, Gadernheim, upper Bensheim, Volker Franzen, Heidelberg; Gerd Hühner, Schopfheim am Baden; Dieter Woltjes, Bensheim am Bergstrasse, all of Germany

[73] Assignee: Ciba-Geigy AG, Basel, Switzerland

[22] Filed: Apr. 21, 1970

[21] Appl. No.: 28,275

Related U.S. Application Data

[63] Continuation of Ser. No. 714,094, March 18, 1968, abandoned.

[30] Foreign Application Priority Data

Mar. 17, 1967 Germany.............................. 52554

[52] U.S. Cl............ 260/609 F; 252/404; 260/45.95
[51] Int. Cl.²........................................ C07C 149/36
[58] Field of Search.................................. 260/609 F

[56] References Cited

UNITED STATES PATENTS

| | | | |
|---|---|---|---|
| 2,322,376 | 6/1943 | McCleary et al............ | 260/609 F X |
| 2,417,118 | 3/1947 | McCleary et al............ | 260/609 F X |
| 3,346,648 | 10/1967 | Worrel ............................ | 260/609 F |
| 3,553,270 | 1/1971 | Wollensak et al.............. | 260/609 F |

OTHER PUBLICATIONS

Reid, "Chemistry of Bivalent Sulfur", I, 25 (1958).
Reid, "Chemistry of Bivalent Sulfur", II, 17 (1960).
Walker, "Formaldehyde,", 3rd. Ed., 310–315, (1953).

*Primary Examiner*—Elbert L. Roberts
*Assistant Examiner*—D. R. Phillips
*Attorney, Agent, or Firm*—Fisher, Christen & Sabol

[57] ABSTRACT

Mono and dimethylene thioethers of dialkyl phenols are prepared by reacting dialkyl phenols at elevated temperatures with formaldehyde and the respective mercapto compound in an inert solvent in the presence of an alkaline compound.

1 Claim, No Drawings

LOWER ALKYLTHIOMETHYLENE CONTAINING PHENOLS

This application is a continuation of application Ser. No. 714,094 filed Mar. 18, 1968, now abandoned.

The invention relates to the preparation and use of aromatic methylene thioethers.

Such compounds correspond to the formulae

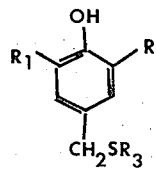 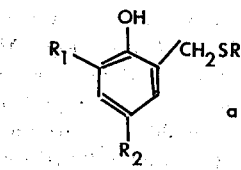 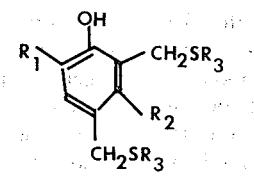

(I)    (II)    (III)

wherein $R_1$ and $R_2$ are the same or different linear or branched alkyl groups having 1 to 6 C atoms, $R_3$ is a linear or branched alkyl group which may contain oxygen or sulfur in ether linkage or which may be substituted by hydroxyl, or it is an alkylene group (in the formation of symmetrical bis phenols).

The compounds are useful for the stabilization of organic compounds and materials against deterioration under the influence of oxygen, light, and heat. They may be used also in combination with other antioxidants and stabilizers.

Compounds of the formula I and II have been prepared by reacting the corresponding Mannich bases

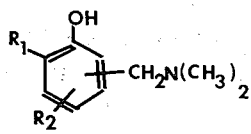

or benzyl chlorides with the respective mercaptides.

We have found a very simple one-step method for the preparation of such compounds which not only allows of obtaining yields which are about 10 % higher than those obtained with the known method but which is also suitable to produce compounds of the formula III which, we believe, have never been prepared before.

In accordance with the invention, dialkyl phenols of the formula

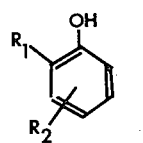 (IV)

are reacted with at least the stoichiometric amounts of formaldehyde and a mercapto compound $$HSR_3$$

 (V)

in an inert solvent in the presence of a base, preferably alkali metal hydroxide.

For the preparation of compounds of the formula III, of course twice the equivalent amounts of formaldehyde and mercapto compound must be employed.

Instead of formaldehyde, compounds developing formaldehyde under the reaction conditions, such as paraformaldehyde or hexamethylene tetramine, can be used.

Suitable inert solvents are, e.g., lower alcohols such as methanol, ethanol, propanol, isopropanol, and diols and polyols and their ethers such as ethylene glycol, diethylene glycol, and ethyleneglycolmonomethylether.

It is a particular advantage of our process that it is not necessary to use the preformed mercapto compound; it is sufficient to form said compound in situ from the readily available alkyl halide and hydrogen sulfide in the presence of alkali metal hydroxide and to react it directly, without isolation, with the dialkyl phenol and formaldehyde. It is surprising that, in this procedure, the mercapto compound reacts substantially completely with the dialkyl phenol and formaldehyde to form the recited compounds without interference from the also present alkali sulfide. In addition, this procedure eliminates the loss which is unavoidable when the mercapto compound has to be first isolated from the reaction mixture; such loss may amount up to 10%.

The preparation of dialkyl phenols containing sulfur containing groups in o and/or p position according to the invention is preferably as follows: To the solution of 0.1 to 1 moles of a base, preferably sodium or potassium hydroxide, in an organic solvent such as a lower alcohol, polyether, or the like, there are added sequentially 1 or 2 moles of the mercapto compound (depending on whether one or two sulfur containing groups shall be introduced into the phenol), 1 mole of the alkylated phenol, and 1.2 to 2 or 2.4 to 4, moles of formaldehyde, paraformaldehyde, or formaldehyde solution. The reaction mixture is refluxed for 1 to 5 hours in a nitrogen atmosphere and, after cooling, neutralized e.g. with acetic acid. The solution is then concentrated in vacuo, and the residue is extracted with ethyl ether. The reaction product, remaining after the ether has been distilled off, can be further purified by recrystallization.

In the modification of the invention where the mercapto compound is formed in situ in the reaction vessel, a suitable procedure is as follows:

Into a solution of 1 to 2 (or 2 to 4) moles of alkali metal hydroxide in a suitable solvent, preferably ethanol or isopropanol, there is introduced at a temperature of 0° to 20°C hydrogen sulfide until the solution is saturated therewith; subsequently, 1 (or 2) mole of alkyl halide are added dropwise, and after the addition of the alkyl halide is terminated, the reaction mixture is maintained for a further hour at a temperature of 60° to 70°C. Then, nitrogen is passed through the solution, 0.7 to 1 moles of alkylated phenol and 1.2 to 2 (or 2.4 to 4) moles of formaldehyde are added, the reaction mixture is refluxed for 1 to 5 hours and processed as described above.

The yields are in the range of 80 to 99 %, calculated on dialkyl phenol.

The invention will be illustrated but not limited by the following examples.

EXAMPLE 1

16 g (0.4 moles) of sodium hydroxide were dissolved in 200 cc of ethyleneglycol monoethylether. To said solution, there were added at 0°C 19.2 g (0.4 moles) of methylmercaptan, 64 cc of a 40% formaldehyde solution (0.8 moles of formaldehyde) and 82.4 g (0.4 moles) of 2,4-di-tert.butylphenol. The obtained mixture was slowly heated to boiling in a gentle nitrogen current. After 2 hours, the mixture was cooled, neutralized with glacial acetic acid, evaporated to dryness in vacuo, and the residue was extracted with ether. The ether was distilled off, and the residual product was recrystallized twice from methanol. There were obtained 88 g of methyl-(3,4-di-tert.butyl-2-hydroxy benzyl) sulfide, having a melting point of 44°–46°C. The yield was 83 per cent of theory.

EXAMPLE 2

Hydrogen sulfide was passed at 20°C into a solution of 45 g (0.8 moles) of potassium hydroxide in 250 cc of ethanol until the solution was saturated. Subsequently, 102 g (0.5 moles) of lauryl chloride were added, and the mixture was heated for 1 hour at 60° to 70°C. After cooling, nitrogen was passed through the solution and 82.4 g (0.4 moles) of 2,4-di-tert.butyl phenol and 64 cc of a formaldehyde solution (0.8 moles of CH$_2$O) were added. The mixture was refluxed for 2 hours, and then processed as described in Example 1. An oil is obtained which can be recrystallized from a methanol - ethanol mixture at -30°C. Yield 80 per cent of theory, calculated on the phenol.

The IR spectrum and elementary analysis (S calc. 7.6%, found 7.2%) confirm that the obtained product is lauryl-(3,5-di-tert.butyl-2-hydroxy-benzyl) sulfide.

EXAMPLE 3

A solution of 45 g (0.8 moles) of potassium hydroxide in 250 cc of ethanol was saturated at 20°C with hydrogen sulfide. 47 g (0.25 moles) of 1,2-dibromoethane were added dropwise, and the mixture was heated at 60°–70°C for 1 hour. After cooling, nitrogen was passed through the reaction solution, and 82.4 g (0.4 moles) of 2,6-di-tert.butylphenol and 80 cc of a 40% aqueous formaldehyde solution (1 mole) were added. The mixture was refluxed for 2 hours and processed as in Example 1.

After recrystallization from methanol, there were obtained 102 g of 1,2-bis-(3,5-di-tert.butyl-4-hydroxybenzylmercapto) ethane (m 143°–144°C), corresponding to a yield of 96%, calculated on phenol.

S calc. 12.1%, found 11.7%.

EXAMPLE 4

To a solution of 4 g (0.1 mole) of sodium hydroxide, there were added sequentially 27 g (0.3 moles) of n-butylmercaptan, 16.4 g (0.1 mole) of 6-tert.butyl-m-cresol and 32 cc of aqueous formaldehyde solution (0.4 moles). The mixture was heated to boiling in a gentle nitrogen current for 5 hours and then processed as in Example 1.

There were obtained 29.4 g (80% of theory) of 2,4-bis-butyl mercaptomethyl-6-tert.butyl-3-methyl phenol.

S calc. 17.4%, found 17.6%.

EXAMPLES 5–22

The compounds of Tables I–III were prepared in a similar manner as shown in the preceding examples.

TABLE I

Compounds of formula I 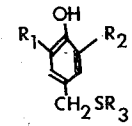

| Ex. | R$_1$ | R$_2$ | R$_3$ | | melting point | yield % | S calc. % | S found % |
|---|---|---|---|---|---|---|---|---|
| 5 | —tert.butyl | —CH$_3$ | —CH$_3$ | | 73–75°C | 90 | 14.3 | 14.6 |
| 6 | —tert.butyl | —tert.butyl | —CH$_2$CH$_2$OH | | 52–55°C | 97 | 10.8 | 9.9 |
| 7 | —tert.butyl | —tert.butyl | —(CH$_2$)$_2$SC$_{16}$H$_{33}$ | | 43–45°C | 85 | 11.9 | 12.1 |
| 8 | —tert.butyl | —tert.butyl | —CH$_2$CH$_2$—S—CH$_2$ | tert.butyl / OH / tert.butyl | 143–144°C | 96 | 12.1 | 11.4 |
| 9 | —tert.butyl | —tert.butyl | —(CH$_2$)$_6$—S—CH$_2$ | tert.butyl / OH / tert.butyl | 70–73°C | 87 | 10.9 | 10.8 |
| 10 | —tert.butyl | —CH$_3$ | —CH$_2$CH$_2$S—CH$_2$ | tert.butyl / OH / tert.butyl | 129–131°C | 98 | 11.5 | 11.2 |
| 11 | —CH$_3$ | —CH$_3$ | —(CH$_2$)$_2$SCH$_2$ | CH$_3$ / OH / CH$_3$ | 140–142°C | 72 | 17.7 | 18.1 |
| 12 | —CH$_3$ | —CH$_3$ | —CH$_2$CH$_2$OH | | 63–65°C | 70 | 15.1 | 15.8 |
| 13 | isopropyl | isopropyl | —CH$_2$—CH$_2$—O—CH$_3$ | | oil | 70 | 11.3 | 11.9 |

TABLE II

Compounds of formula II

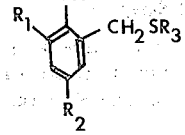

| Ex. | R₁ | R₂ | R₃ | physical properties | yield % | S calc. % | S found % |
|---|---|---|---|---|---|---|---|
| 14 | —tert.butyl | —tert.butyl | —CH₃ | m 44–46°C | 83 | 12.0 | 12.1 |
| 15 | —tert.butyl | —CH₃ | —CH₃ | b₀.₁₂ 93–95 °C | 85 | 14.3 | 14.4 |
| 16 | —tert.butyl | —tert.butyl | —ₙC₁₂H₂₅ | oil, n_D²⁰ 1.5029 | 80 | 7.6 | 7.2 |
| 17 | —tert.butyl | —tert.butyl | —CH₂—CH₂—S—CH₂ 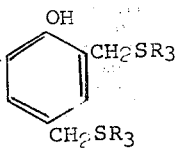 | 135–137°C | 79 | 12.08 | 12.25 |

Table III

Compounds of formula III $$R_1 \underset{CH_2SR_3}{\overset{OH}{\underset{CH_2SR_3}{\bigcirc}}}$$

| Example | R₁ | R₂ | R₃ | physical properties | yield % | S calc. % | S found % |
|---|---|---|---|---|---|---|---|
| 18 | —tert.butyl | —CH₃ | —CH₃ | m 88–90°C | 70 | 22.6 | 21.9 |
| 19 | —tert.butyl | —CH₃ | —ₙC₄H₉ | oil | 80 | 17.4 | 17.6 |
| 20 | —tert.butyl | —CH₃ | —ₙC₁₂H₂₅ | m 41–43°C | 75 | 10.8 | 10.2 |
| 21 | —tert.butyl | —CH₃ | —CH₂—CH—C₄H₉ / C₂H₅ | oil | 82 | 13.3 | 13.1 |
| 22 | —CH₃ | —CH₃ | —C₁₂H₂₅ | m 43–45°C | 72 | 11.6 | 11.3 |

The compounds obtained by the process of the invention are good stabilizers for polystyrene resins, esters, and synthetic oils such as polymer oils against their deterioration by oxygen, light, and heat.

Examples of polystyrene resins which can be thus stabilized, are impact resistant polystyrene resins, e.g., copolymers of butadiene and styrene, ABS resins, MBS resins, and SAN resins. Esters stabilized by the compounds are, e.g., phthalic esters used as plasticizers, or polyesters such as dicarboxylic acid - diol condensation products.

Particular good stabilization has been observed with compounds of the recited formulae in which R₁ is tert.butyl and R₂ methyl.

The compounds of the invention show a greater stabilizing effect than the phenyl derivatives used heretofore for this purpose, such as 2,6-di-tert.butyl-p-cresol or the hydroxy-alkylphenyl alkanoic acid esters disclosed in the German DAS No. 1,201,349. The stabilizing effect can be still further improved by the use of additional stabilizers, particularly organic phosphites such as trisnonylphenyl phosphite.

The novel stabilizers are generally applied in amounts of 0.01 to 10 % by weight of the organic substance to be stabilized.

The following examples are given to illustrate the use of the compounds prepared according to the invention as stabilizers. All parts are given by weight unless indicated otherwise.

EXAMPLE 23

All the tests hereinafter set forth in Table IV were made with the same ABS polymer which had the approximate composition by weight of 5% acrylonitrile, 15% butadiene, and 80% styrene. Test samples were prepared by hot milling at about 160°C for 10 minutes compositions containing 100 parts of the ABS resin, 1 part of a lubricant (1,2-bis-stearoyl amino ether) and 0.5 parts of the stabilizer. The obtained films were pressed under a pressure of 200 atm. and a temperature of 180°C to plates of 1 mm thickness, which were cut to strips and placed in a drying cabinet at a temperature of 100°C for accelerated ageing. The stabilizing efficiency was measured by the change of color and brittleness of the strips. The following results were obtained.

TABLE IV

| Stabilizer | color after 50 days | brittle after |
|---|---|---|
| 2,6 di-tert.butyl-p-cresol | brown | 73 days |
| 4,4'-thio-bis (6-tert.butyl-m-phenol) | dark brown | 84 days |
| beta-(3,5-di-tert.butyl-4-hydroxylphenyl)-propionic acid stearyl ester | brown | 65 days |
| stabilisator of example 18 | yellow | 92 days |

EXAMPLE 24

Stabilization of an MBS Resin

The tests listed in Table V were made with the same MBS polymer which had the approximate composition by weight of 16% methacrylic acid ester, 80% butadiene, and 4% styrene.

Test samples were prepared by hot milling at 170°C for 10 minutes the resin compositions containing the stabilizer and pressing the obtained films in a platen press under a pressure of 200 atm. at a temperature of 190°C to plates of 1 mm thickness which were cut into 5 strips and aged in a drying cabinet at 90°C.

The stabilizing effect was determined by the color changes and brittleness of the strips. The following results were obtained.

TABLE V

| | Stabilizer | color after 20 days | brittle after |
|---|---|---|---|
| 0.3% | 2,6-di-tert.butyl-p-cresol | yellow | 18 days |
| 0.3% | stabilizer of example 5 | yellow | 30 days |
| 0.5% | beta(3,5-di-tert.butyl-4-hydroxylphenyl) propionic acid stearyl ester | yellow | 27 days |
| 0.25% | stabilizer of example 5 | colorless | 34 days |
| 0.25% | tris-nonyl-phenylphosphite | | |

EXAMPLE 25

Stabilization of Impact Resistant Polystyrene

The impact resistant polystyrene was a blend of 88 parts of polystyrene and 12 parts of a butadiene-styrene copolymer which contained as stabilizer 1.2% of tris-nonylphenyl phosphite. 12 g each of said copolymer were plasticized on a laboratory roller mill at 175°C, then 150 mg of the stabilizer listed in Table VI, and subsequently 88 g of polystyrene were added, and the blends were hot milled at 175°C for 10 minutes and at 180°C and 200 atmospheres pressed to plates which were cut into 5 strips and stored in a drying cabinet at 85°C. The stabilizing effect was determined by the time of beginning brittleness of the samples.

TABLE VI

| | Stabilizer | brittle after |
|---|---|---|
| 0.15% | 2,2'-methylene-bis-(4-methyl-6-tert.butylphenol | 22 days |
| 0.15% | 2,6-di-tert.butyl-p-cresol | 15 days |
| 0.15% | stabilizer of example 5 | 26 days |

EXAMPLE 26

Stabilization of Dioctyl Phthalate

Blends of 3 g each were prepared from dioctyl phthalate and the stabilizers of Table VII. The blends were heated in a closed vessel under oxygen at 192°C. The time was determined after which the plasticizer took up oxygen and the pressure had dropped by 20 torr. Said oxygen absorption indicates the start of the degradation.

TABLE VII

| | Stabilizer | Pressure drop by 20 torr after |
|---|---|---|
| 0.2% | beta-(3,5-di-tert.butyl-4-hydroxypropionic acid stearyl ester | 2.5 hours |
| 0.2% | 2,6-di-tert.butyl-p-cresol | 4 hours |
| 0.2% | 4,4'-di-hydroxy-diphenyl-propane-2,2 (bisphenol A) | 4 hours |
| 0.5% | 4,4'-di-hydroxy-diphenyl-propane-2,2 (bisphenol A) | 5.5 hours |
| 0.2% | stabilizer of example 5 | 7.5 hours |

The table shows that the stabilizers of the invention are superior to considerably larger amounts of the well known stabilizer bisphenol A.

EXAMPLE 27

Stabilization of Polymer Oil

Mixtures of 3 g each were prepared from a copolymer of ethylene and polyisobutanol with 0.2 per cent of the stabilizers listed in Table VIII and their oxygen absorption was determined as in Example 26.

TABLE VIII

| Stabilizer | Pressure drop by 20 torr after |
|---|---|
| bisphenol A | 1 hour 50 minutes |
| 2,6-di-tert.butyl-p-cresol | 2 hours 30 minutes |
| stabilizer of example 11 | 4 hours |
| stabilizer of example 14 | 2 hours 50 minutes |

We claim:

1. As new composition of matter, compounds of the formula

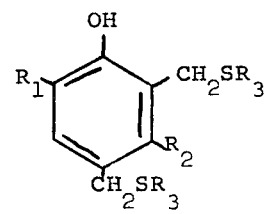

wherein $R_1$ and $R_2$ are selected from the group consisting of methyl, isopropyl and t-butyl, $R_3$ is selected from the group consisting of a straight or branched-chain member of the group consisting of alkyl, and alkylene having one to three carbon atoms wherein only one of said $R_3$ can be alkylene.

* * * * *